US012270633B2

(12) United States Patent
Choi

(10) Patent No.: US 12,270,633 B2
(45) Date of Patent: Apr. 8, 2025

(54) DEVICE AND METHOD THEREOF FOR DETERMINING DETONATOR INFORMATION BY USING WIRELESS SIGNAL

(71) Applicant: HANWHA CORPORATION, Seoul (KR)

(72) Inventor: Jeong Ho Choi, Boeun-gun (KR)

(73) Assignee: HANWHA CORPORATION, Seoul (KR)

( * ) Notice: Subject to any disclaimer, the term of this patent is extended or adjusted under 35 U.S.C. 154(b) by 0 days.

(21) Appl. No.: 18/008,752

(22) PCT Filed: Oct. 7, 2022

(86) PCT No.: PCT/KR2022/015159
§ 371 (c)(1),
(2) Date: Dec. 7, 2022

(87) PCT Pub. No.: WO2023/128162
PCT Pub. Date: Jul. 6, 2023

(65) Prior Publication Data
US 2024/0230302 A1  Jul. 11, 2024

(30) Foreign Application Priority Data
Dec. 29, 2021  (KR) .......................... 10-2021-0191091

(51) Int. Cl.
*F42D 1/055* (2006.01)
*E21B 43/1185* (2006.01)

(52) U.S. Cl.
CPC .......... *F42D 1/055* (2013.01); *E21B 43/1185* (2013.01)

(58) Field of Classification Search
CPC . F42D 1/045; F42D 1/055; F42D 1/00; G01S 17/06; F42C 13/04; E21B 43/1185
USPC ........................................................ 361/248
See application file for complete search history.

(56) References Cited

U.S. PATENT DOCUMENTS

| 2005/0103219 A1 | 5/2005 | McClure et al. |
| 2005/0213082 A1* | 9/2005 | DiBernardo ......... G05D 1/0234 356/139.03 |
| 2016/0195379 A1* | 7/2016 | Van Wyk .................. F42D 1/05 102/200 |

FOREIGN PATENT DOCUMENTS

| KR | 10-2019-0043306 A | 4/2019 |
| KR | 10-2020-0077235 A | 6/2020 |

* cited by examiner

*Primary Examiner* — Kevin J Comber
(74) *Attorney, Agent, or Firm* — WHDA, LLP

(57) ABSTRACT

A device and a method thereof for determining detonator information by using a wireless signal are proposed. The device includes an electromagnetic wave reception unit configured to receive an electromagnetic wave transmitted from a detonator in a blast hole, a coordinate derivation unit configured to detect the received electromagnetic wave and derive the electromagnetic wave as coordinates, a blast hole location determination unit configured to determine a location of the blast hole on the basis of a flickering pattern of the electromagnetic wave derived as the coordinates, and a detonator ID acquisition unit configured to acquire an ID of the detonator in the corresponding blast hole on the basis of the determined location of the blast hole.

2 Claims, 3 Drawing Sheets

DEVICE AND METHOD THEREOF FOR DETERMINING DETONATOR INFORMATION BY USING WIRELESS SIGNAL

TECHNICAL FIELD

The present disclosure relates to a device and a method thereof for determining detonator information by using a wireless signal and, more particularly, to a device and a method thereof for determining detonator information by using a wireless signal, wherein an electromagnetic wave emitted from a detonator in a blast hole is detected and derived as coordinates, and a location of the blast hole and an ID of the detonator in the blast hole are determined on the basis of a flickering pattern of the electromagnetic wave derived as the coordinates.

BACKGROUND ART

In general, when single-face blasting work is performed, after an electronic detonator is charged into a blast hole, connectors should be aligned in a desired time-in-milliseconds sequence when to connect to a trunk wire, and a code attached to each connector or each wire should be read with a reading device in the corresponding sequence when to obtain an ID. In this case, when the sequence is wrong, the time-in-milliseconds sequence is also changed, so there may occur cases where blasting efficiency is affected, and a cross-section after blasting is poorly formed or follow-up work is required. In addition, when the blasted cross-section is large, an additional time is required because work at height should be performed aboard equipment to collect the ID.

Meanwhile, in another type of electronic detonator, a time in milliseconds is assigned in advance or a time in milliseconds is assigned on the spot before a detonator is charged into a blast hole, so the electronic detonator has the same method as that of the existing non-electric detonator. However, in this case as well, the possibility of a work error occurring due to human errors may not be ruled out.

As described above, in the case where the time in milliseconds is assigned in advance, there is a difficulty in logistics management, and in the case where the time in milliseconds is assigned on the spot, there is a disadvantage in that the possibility of work errors is high because of no separate marking.

In this regard, Korean Patent Application Publication No. 2000-0061481 discloses "METHOD FOR DESIGNING TUNNEL-BLASTING PATTERN DIAGRAM AND RECORDING MEDIUM WITH PROGRAM FOR PROVIDING TUNNEL-BLASTING PATTERN DIAGRAM".

DISCLOSURE

Technical Problem

The present disclosure is devised to solve the above problems, and an objective of the present disclosure is to provide a device and a method thereof for determining detonator information by using a wireless signal, wherein an electromagnetic wave emitted from a detonator in a blast hole is detected and derived as coordinates, and a location of the blast hole and an ID of the detonator in the blast hole are determined on the basis of a flickering pattern of the electromagnetic wave derived as the coordinates.

In addition, another objective of the present disclosure is to provide a device and a method thereof for determining detonator information by using a wireless signal, wherein the detonator information including a location of the determined blast hole and an obtained ID of the detonator in the corresponding blast hole is schematized and output to a display means, and an input of setting information for setting at least any one of a blasting sequence and a time in milliseconds on the basis of the schematically output detonator information is received and transmitted to blasting equipment.

Technical Solution

According to the present disclosure for achieving the above objectives, there is provided a device for determining detonator information by using a wireless signal, the device including: an electromagnetic wave reception unit configured to receive an electromagnetic wave transmitted from a detonator in a blast hole; a coordinate derivation unit configured to detect the received electromagnetic wave and derive the electromagnetic wave as coordinates; a blast hole location determination unit configured to determine a location of the blast hole on the basis of a flickering pattern of the electromagnetic wave derived as the coordinates; and a detonator ID acquisition unit configured to acquire an ID of the detonator in the corresponding blast hole on the basis of the determined location of the blast hole.

In addition, the electromagnetic wave reception unit may receive the electromagnetic wave having the flickering pattern including identification information of the detonator at the location of the blast hole, the electromagnetic wave being transmitted by the detonator in the blast hole after receiving a command of blasting equipment.

In addition, the coordinate derivation unit may recognize a transmission position and intensity according to the flickering pattern of the electromagnetic wave received by using an electromagnetic wave detection sensor, and derive the transmission position and the intensity as x, y coordinates.

In addition, the device may further include an information output unit configured to schematize the detonator information including the determined location of the blast hole and the acquired ID of the detonator in the corresponding blast hole, and output the schematized detonator information to a display means.

In addition, the device may further include a setting information transmission unit configured to receive an input of setting information for setting at least any one of a blasting sequence and a time in milliseconds on the basis of the schematically output detonator information, and transmit the setting information to the blasting equipment.

According to the present disclosure for achieving the above objectives, there is provided a method for determining detonator information by using a wireless signal, the method including: receiving, by an electromagnetic wave reception unit, an electromagnetic wave transmitted from a detonator in a blast hole; detecting, by a coordinate derivation unit, the received electromagnetic wave and deriving the electromagnetic wave as coordinates; determining, by a blast hole location determination unit, a location of the blast hole on the basis of a flickering pattern of the electromagnetic wave derived as the coordinates; and acquiring, by a detonator ID acquisition unit, an ID of the detonator in the corresponding blast hole on the basis of the determined location of the blast hole.

In addition, in the receiving of the electromagnetic wave transmitted from the detonator in the blast hole, the electromagnetic wave having the flickering pattern including identification information of the detonator at the location of the blast hole, the electromagnetic wave being transmitted by the detonator in the blast hole after receiving a command of blasting equipment, may be received.

In addition, in the detecting of the received electromagnetic wave and derive the electromagnetic wave as the coordinates, a transmission position and intensity according to the flickering pattern of the electromagnetic wave received by using an electromagnetic wave detection sensor may be recognized and derived as x, y coordinates.

In addition, the method may further include, after the acquiring of the ID of the detonator in the corresponding blast hole on the basis of the determined location of the blast hole, schematizing the detonator information including the determined location of the blast hole and the acquired ID of the detonator in the corresponding blast hole, and outputting the schematized detonator information to a display means.

In addition, the method may further include, after the schematizing of the detonator information including the determined location of the blast hole and the acquired ID of the detonator in the corresponding blast hole, and the outputting of the schematized detonator information to the display means, receiving an input of setting information for setting at least any one of a blasting sequence and a time in milliseconds on the basis of the schematically output detonator information, and transmitting the setting information to the blasting equipment.

Advantageous Effects

According to the present disclosure for achieving the above objectives, in the device and the method thereof for determining the detonator information by using the wireless signal, the electromagnetic wave emitted from the detonator in the blast hole is detected and derived as the coordinates, and the location of the blast hole and the ID of the detonator in the blast hole are determined on the basis of the flickering pattern of the electromagnetic wave derived as the coordinates, so that wiring and ID reading work according to the time-in-milliseconds blasting sequence of the detonator is omitted, whereby there is an effect that the efficiency of blasting work may be improved and the possibility of human errors may be maximally reduced.

In addition, in the present disclosure, the detonator information including the determined location of the blast hole and the obtained ID of the detonator in the corresponding blast hole is schematized and output to the display means, and the input of the setting information for setting at least any one of the blasting sequence and the time in milliseconds on the basis of the schematically output detonator information is received and transmitted to the blasting equipment, whereby there is another effect that the tasks of collecting detonator IDs and assigning the time in milliseconds, which are a significant portion of tunnel and underground blast setting work, may be simplified.

BEST MODE

Figure 1:
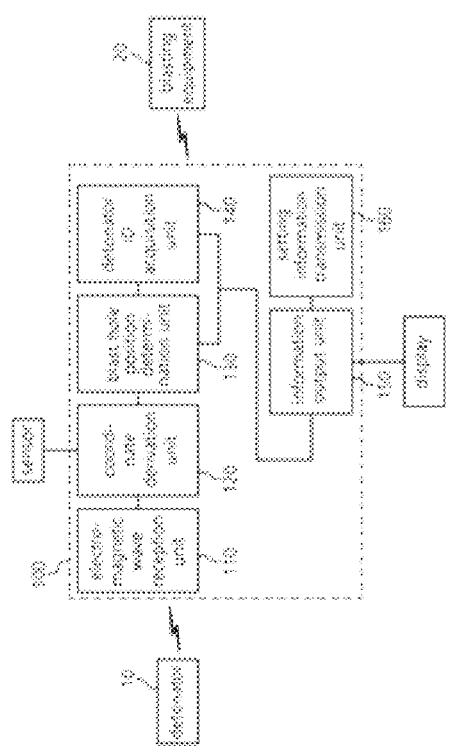
FIG. 1 is a view illustrating a configuration of a device for determining detonator information by using a wireless signal according to the present disclosure.

In the present disclosure, various modifications may be made and various exemplary embodiments may be provided, and specific exemplary embodiments will be illustrated in the drawings and described in detail.

However, this is not intended to limit the present disclosure to a particular disclosed form. On the contrary, the present disclosure is to be understood to include all various alternatives, equivalents, and substitutes that may be included within the idea and technical scope of the present disclosure. While describing each drawing, similar reference numerals have been used for similar components.

When a component is described as being "connected", "coupled", or "linked" to another component, that component may be directly connected, coupled, or linked to that other component. However, it should be understood that yet another component between each of the components may be present. In contrast, it should be understood that when a component is referred to as being "directly coupled" or "directly connected" to another component, there are no intervening components present.

The terminology used herein is for the purpose of describing particular exemplary embodiments only and is not intended to be limiting. As used herein, the singular forms are intended to include the plural forms as well, unless the context clearly indicates otherwise. In addition, it will be further understood that the terms "comprise", "include", "have", etc. when used in the present application, specify the presence of stated features, integers, steps, operations, elements, components, and/or combinations of them but do not preclude the possibility of the presence or addition of one or more other features, integers, steps, operations, elements, components, and/or combinations thereof.

Hereinafter, preferred exemplary embodiments of the present disclosure will be described in more detail with reference to the accompanying drawings. Hereinafter, the same reference numerals are used for the same components in the drawings, and duplicate descriptions for the same components are omitted.

First, a system to which a device for determining detonator information by using a wireless signal according to the present disclosure is applied largely includes: a detonator 10 in a blast hole; blasting equipment 20 for transmitting a blasting command to the detonator; and a device 100 for determining the detonator information by using the wireless signal of the present disclosure.

FIG. 1 is a view illustrating a configuration of the device for determining the detonator information by using the wireless signal according to the present disclosure.

Describing with reference to FIG. 1, the device 100 for determining the detonator information by using the wireless signal according to the present disclosure largely includes: an electromagnetic wave reception unit 110, a coordinate derivation unit 120, a blast hole position determination unit 130, a detonator ID acquisition unit 140, an information output unit 150, and a setting information transmission unit 160.

The electromagnetic wave reception unit 110 receives an electromagnetic wave transmitted from a detonator in a blast hole.

The electromagnetic wave reception unit 110 receives the electromagnetic wave having a flickering pattern including identification information of the detonator at a location of the blast hole, the electromagnetic wave being transmitted by the detonator in the blast hole after receiving a command of the blasting equipment. In this case, the blast hole may be provided with a separate means capable of transferring the electromagnetic wave, emitted from the detonator in the blast hole, to the outside. For example, when the electromagnetic wave is infrared or visible light, the separate means is an optical fiber, and may be a conductive antenna in other cases, but is not limited thereto.

The coordinate derivation unit 120 detects the received electromagnetic wave and derives coordinates.

The coordinate derivation unit 120 recognizes a transmission position and intensity according to the flickering pattern of the received electromagnetic wave by using an electromagnetic wave detection sensor, and derives the transmission position and intensity as x, y coordinates. In this case, the electromagnetic wave detection sensor may be a Charge Coupled Device (CCD), Active Electronically Scanned Array (AESA), and the like, which are provided with integrated cells for detecting an electromagnetic wave and the like, including light (i.e., infrared light, visible light, and the like).

The blast hole location determination unit 130 determines the location of the blast hole on the basis of the flickering pattern of the electromagnetic wave derived as the coordinates.

The detonator ID acquisition unit 140 acquires the ID of the detonator in the blast hole on the basis of the determined location of the blast hole.

The information output unit 150 schematizes the detonator information including the determined location of the blast hole and the obtained ID of the detonator in the corresponding blast hole, and outputs the schematized detonator information to a display means.

The setting information transmission unit 160 receives an input of setting information for setting at least any one of a blasting sequence and a time in milliseconds on the basis of the schematically output detonator information, and transmits the setting information to the blasting equipment.

That is, the setting information transmission unit 160 makes the setting information to be overlaid on a pre-designed blasting pattern or allows a worker to easily set instantaneous time and time-in-milliseconds intervals on the spot through manipulation by hand, and transmits the setting information to the blasting equipment when the setting information is input in such a way that a time in milliseconds for each detonator is determined. Accordingly, the blasting equipment transmits the time-in-milliseconds information to the corresponding detonator through wired communication.

Figure 2:
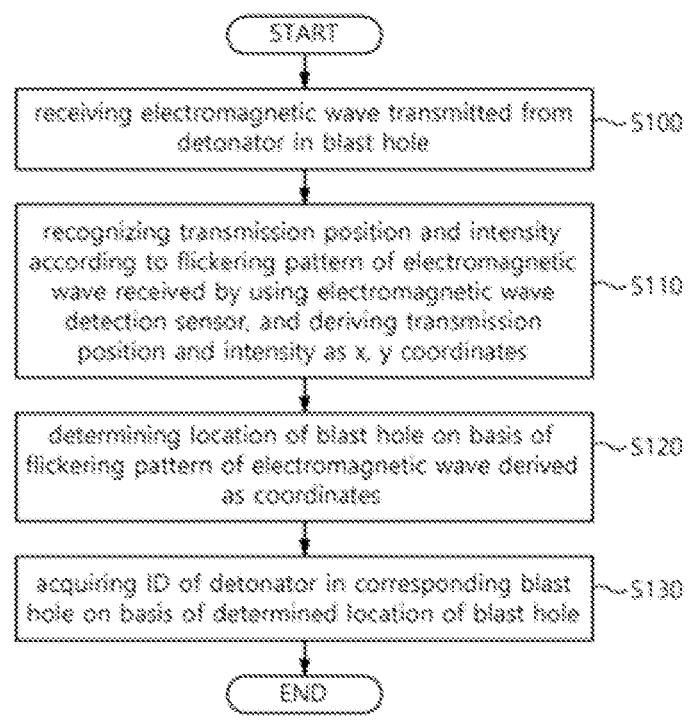
FIG. 2 is a flowchart illustrating a sequence of a method for determining detonator information by using a wireless signal according to the present disclosure.

FIG. 2 is a flowchart illustrating a sequence of a method for determining detonator information by using a wireless signal according to the present disclosure.

Describing with reference to FIG. 2, the method of determining the detonator information by using the wireless signal according to the present disclosure is to use the device for determining the detonator information by using the wireless signal described above, and the duplicate description below will be omitted.

First, in step S100, an electromagnetic wave transmitted from a detonator in a blast hole is received.

In step S100, an electromagnetic wave having a flickering pattern including identification information of a detonator at a location of a blast hole, the electromagnetic wave being transmitted by the detonator in the blast hole after receiving a command of blasting equipment, is received.

Next, in step S110, the received electromagnetic wave is detected and derived as coordinates.

In step S110, a transmission position and intensity according to the flickering pattern of the received electromagnetic wave are recognized by using an electromagnetic wave detection sensor, and are derived as x, y coordinates. In this case, the electromagnetic wave detection sensor may be a Charge Coupled Device (CCD), Active Electronically Scanned Array (AESA), and the like, which are integrated cells for detecting an electromagnetic wave and the like, including light (i.e., infrared light, visible light, and the like).

Next, in step S120, a location of the blast hole is determined on the basis of the flickering pattern of the electromagnetic wave derived as the coordinates.

Next, in step S130, an ID of the detonator in the blast hole is acquired on the basis of the determined location of the blast hole.

Figure 3:
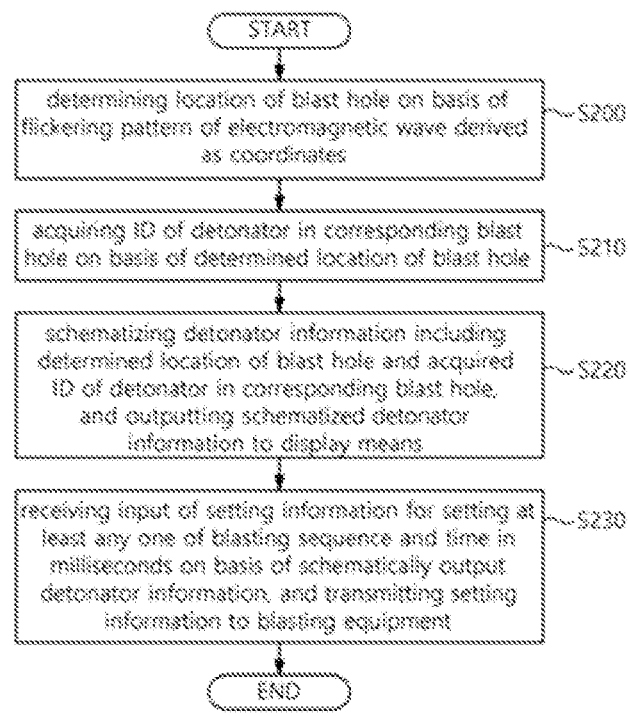
FIG. 3 is a flowchart illustrating a sequence of operating the detonator information determined in the method for determining the detonator information by using the wireless signal according to the present disclosure.

FIG. 3 is a flowchart illustrating a sequence of operating detonator information determined in the method for determining the detonator information by using the wireless signal according to the present disclosure.

Describing with reference to FIG. 3, a sequence of operating the detonator information determined in the method for determining the detonator information by using the wireless signal according to the present disclosure is as follows.

First, in step S200, the position of the blast hole is determined on the basis of the flickering pattern of the electromagnetic wave derived as the coordinates.

Next, in step S210, the ID of the detonator in the blast hole is acquired on the basis of the determined location of the blast hole.

Next, in step S220, the detonator information including the determined location of the blast hole and the acquired ID of the detonator in the corresponding blast hole are schematized and output to the display means.

Next, in step S230, the input of the setting information for setting at least any one of the blasting sequence and the time in milliseconds on the basis of the schematically output detonator information is received and transmitted to the blasting equipment.

In step S230, the setting information is made to be overlaid on a pre-designed blasting pattern, or a worker is allowed to easily set instantaneous time and time-in-milliseconds intervals on the spot through manipulation by hand, and when the setting information is input in such a way that a time in milliseconds for each detonator is determined, the setting information is transmitted to the blasting equipment.

Accordingly, the blasting equipment transmits the time-in-milliseconds information to the corresponding detonator through wired communication.

As described above, the functional operation and the embodiments related to the present subject matter, which are described in the present specification, may be implemented in a digital electronic circuit or computer software, firmware, hardware, or a combination of one or more thereof, including the structures and structural equivalents thereof, which are disclosed herein.

The embodiments of the subject matter described herein may be implemented as one or more computer program products, i.e., one or more modules related to computer program instructions encoded on a tangible program medium for execution by or for controlling the operation of a data processing device. The tangible program medium may be a radio wave signal or a computer-readable medium. The radio wave signal is a signal generated to encode information for transmission to an appropriate receiver device for execution by a computer, that is, for example, an artificially generated signal such as a machine-generated electrical, optical, or electromagnetic signal. The computer-readable medium may be a machine-readable storage device, a machine-readable storage substrate, a memory device, a combination of materials that affect a machine-readable radio wave signal, or a combination of one or more thereof.

A computer program (i.e., also known as a program, software, software application, a script, or a code) may be written in any form of any programming language, including compiled or interpreted language or a priori or procedural language, and may be deployed in any form, including a standalone program or module, a component, a subroutine, or other unit suitable for use in a computer environment.

The computer program does not necessarily correspond to a file in a file device. The program may be stored in a single file provided to a requested program, or in multiple interactive files (e.g., files storing one or more modules, subprograms, or portions of codes), or in a portion of a file that stores other programs or data (e.g., one or more scripts stored within a markup language document).

The computer program may be deployed to be executed on one computer or multiple computers located at one site or distributed over a plurality of sites and interconnected by a communication network.

Additionally, the logic flows and structural block diagrams described in the present patent document are intended to describe corresponding functions supported by the disclosed structural means and corresponding actions and/or specific methods supported by the disclosed steps, and may also be used to implement corresponding software structures and algorithms and their equivalents.

The processes and logic flows described herein may be performed by one or more programmable processors executing one or more computer programs in order to perform functions by operating on received data and generating outputs.

Processors suitable for the execution of the computer programs include, for example, both general and special purpose microprocessors and any one or more processors of any form of digital computer. In general, the processor will receive instructions and data from either read-only memory or random access memory or both.

A key component of a computer is one or more memory devices for storing instructions and data and a processor for executing the instructions. In addition, generally, a computer is configured to perform an operation of receiving data from one or more mass storage devices for storing data, e.g., magnetic, magneto-optical disks or optical disks, or perform an operation of transmitting the data by using the mass storage devices, or compose or include the data operably to perform both of the operations. However, the computer is not required to have such devices.

The present description presents the best mode of the present disclosure, and provides examples for describing the present disclosure and for enabling those skilled in the art to make and use the present disclosure. The specification written in this way is not intended to limit the present disclosure to the specific terms presented.

Accordingly, although the present disclosure has been described in detail with reference to the above-described examples, those skilled in the art can make modifications, changes, and deformation to the present examples without departing from the scope of the present disclosure. In short, in order to achieve the intended effect of the present disclosure, it is not necessary to separately include all the functional blocks shown in the drawings or follow all the orders shown in the drawings. It should be noted that even though all the functional blocks are separately included or all the orders shown in the drawings are followed as they are shown, the corresponding functional blocks and orders may fall within the technical scope of the present invention described in the claims.

The invention claimed is:

1. A device for determining detonator information by using a wireless signal, the device comprising:
    an electromagnetic wave reception unit configured to receive an electromagnetic wave transmitted from a detonator in a blast hole;
    a coordinate derivation unit configured to detect the received electromagnetic wave and derive the electromagnetic wave as coordinates;
    a blast hole location determination unit configured to determine a location of the blast hole on the basis of a flickering pattern of the electromagnetic wave derived as the coordinates;
    a detonator ID acquisition unit configured to acquire an ID of the detonator in the corresponding blast hole on the basis of the determined location of the blast hole;
    an information output unit configured to schematize the detonator information comprising the determined location of the blast hole and the acquired ID of the detonator in the corresponding blast hole; and
    a setting information transmission unit configured to receive an input of setting information for setting at least any one of a blasting sequence and a time in milliseconds on the basis of the schematically output detonator information, and transmit the setting information to a blasting equipment,
    wherein the electromagnetic wave reception unit receives the electromagnetic wave having the flickering pattern comprising identification information of the detonator at the location of the blast hole, the electromagnetic wave being transmitted by the detonator in the blast hole after receiving a command of the blasting equipment, and
    wherein the coordinate derivation unit recognizes a transmission position and intensity according to the flickering pattern of the electromagnetic wave received by using an electromagnetic wave detection sensor and derives the transmission position and the intensity as coordinates.

2. A method for determining detonator information by using a wireless signal, the method comprising:
    receiving, by an electromagnetic wave reception unit, an electromagnetic wave transmitted from a detonator in a blast hole;
    detecting, by a coordinate derivation unit, the received electromagnetic wave and deriving the electromagnetic wave as coordinates;
    determining, by a blast hole location determination unit, a location of the blast hole on the basis of a flickering pattern of the electromagnetic wave derived as the coordinates;
    acquiring, by a detonator ID acquisition unit, an ID of the detonator in the corresponding blast hole on the basis of the determined location of the blast hole;
    after the acquiring of the ID of the detonator in the corresponding blast hole on the basis of the determined location of the blast hole,
    schematizing the detonator information comprising the determined location of the blast hole and the acquired ID of the detonator in the corresponding blast hole; and after the schematizing of the detonator information comprising the determined location of the blast hole and the acquired ID of the detonator in the corresponding blast hole, receiving an input of setting information for setting at least any one of a blasting sequence and a time in milliseconds on the basis of the schematically output detonator information, and transmitting the setting information to a blasting equipment, wherein, in the receiving of the electromagnetic wave transmitted from the detonator in the blast hole, the electromagnetic wave having the flickering pattern comprising identification information of the detonator at the location of the blast hole, the electromagnetic wave being transmitted by the detonator in the blast hole after receiving a command of the blasting equipment, is received, and wherein, in the detecting of the received electromagnetic wave and deriving the electromagnetic wave as the coordinates, a transmission position and intensity according to the flickering pattern of the electromagnetic wave received by using an electromagnetic wave detection sensor is recognized and derived as coordinates.

* * * * *